Dec. 30, 1930.  L. M. CHRISTIE  1,786,425
CONDUIT AND METHOD OF MAKING SAME
Filed April 6, 1928
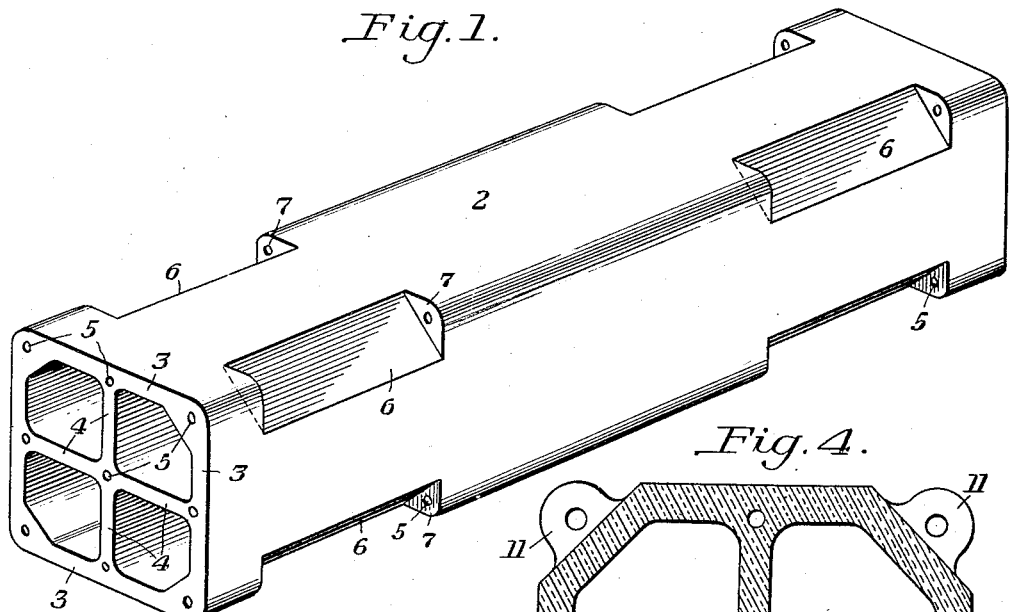
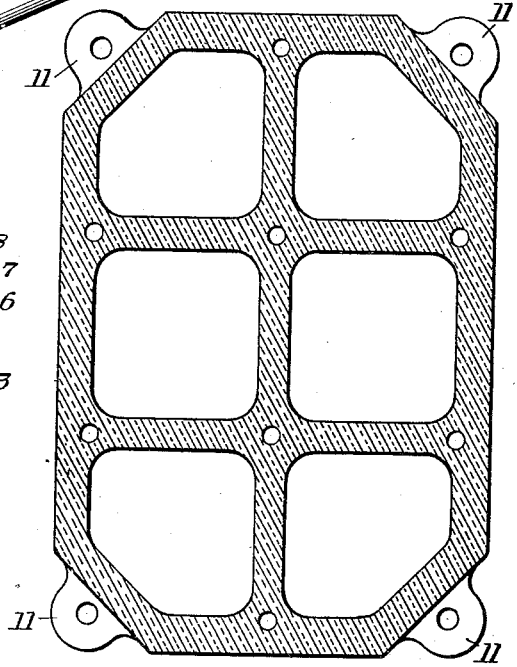
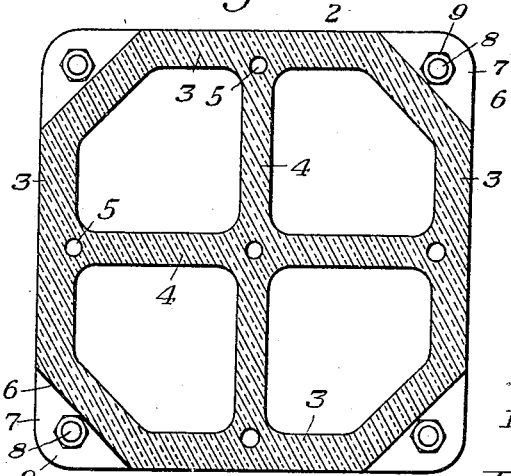
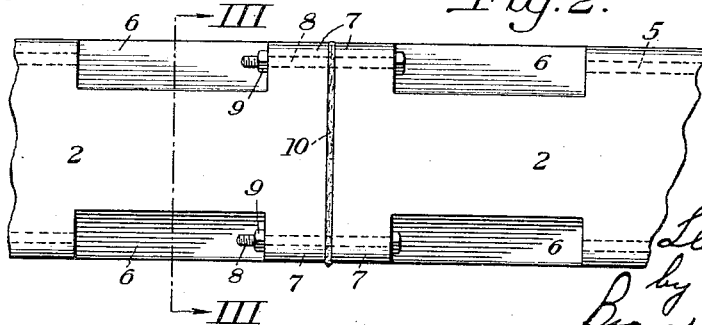
INVENTOR
Llewellyn M. Christie
by
Byrnes, Stebbins & Parmelee
his attorneys Patented Dec. 30, 1930

1,786,425

UNITED STATES PATENT OFFICE

LLEWELLYN M. CHRISTIE, OF PITTSBURGH, PENNSYLVANIA, ASSIGNOR, BY MESNE ASSIGNMENTS, TO NATIONAL FIREPROOFING CORPORATION, OF PITTSBURGH, PENNSYLVANIA, A CORPORATION OF PENNSYLVANIA

CONDUIT AND METHOD OF MAKING SAME

Application filed April 6, 1928. Serial No. 267,851.

This invention relates to conduit and its manufacture, and more particularly to conduit for containing current carrying conductors. It relates still more particularly to a conduit of such type, the sections of which are adapted to be positively secured together to form in effect an integral conduit and the joints between adjacent sections of which are adapted to be effectively sealed in a simple, efficient and inexpensive manner.

Conduit for containing current carrying conductors has heretofore been made in sections adapted to be joined together by cement or some generally similar means. This type of joint in electric installations has been found to have numerous disadvantages. It is often difficult to properly align the sections so that the wire or cable passages are properly matched. This is particularly true in multiple duct conduit wherein the wire or cable ducts are relatively small and must be carefully aligned. Furthermore, a cement or mortar joint is likely to crack and to leak moisture, dirt and other foreign matter which is detrimental to the installation.

I provide a conduit for electric installations made up of sections which are adapted to be positively secured together, the joints between adjacent sections being effectively sealed to prevent leakage or any impairment of the insulation afforded the wires or cables within the conduit.

I further provide a conduit section which is adapted to be very simply and economically manufactured and which affords by reason of its construction greater insulation to the contained wires or cables than would be afforded by any conduit the sections of which are adapted to be positively connected which has heretofore been produced.

I further provide a method of forming a conduit section of the type above mentioned which comprises extruding a length of material of substantially constant cross-section and removing part of the material to provide for the connection of the section to an adjacent section.

I still further provide a conduit the sections of which are adapted to be connected by mechanical means in such a manner that the connectors are disposed within the periphery of the body of the conduit. This provision eliminates flanges, bolt heads, washers and the like extending beyond the body of the conduit which are objectionable for various reasons.

In the accompanying drawings I have shown a present preferred embodiment of the invention wherein Figure 1 is a perspective view of a conduit section;

Figure 2 is a plan view of a portion of a conduit made up of sections such as shown in Figure 1;

Figure 3 is a cross-section on the line III—III of Figure 2; and

Figure 4 is a cross-section of a modified form of conduit.

Referring more particularly to the drawings, reference numeral 2 designates generally a section of conduit especially adapted for electric installations. The conduit is formed of outer walls 3 and inner walls or partitions 4 which serve to divide the interior of the conduit into four wire or cable receiving ducts. The section is provided with a plurality of holes 5 which extend longitudinally thereof throughout its entire length. Some of these holes 5 are placed adjacent the corners of the section.

Portions of the outer wall of the section are removed at 6, thereby in effect forming small outwardly projecting flanges 7 at the corners of the section. The corner holes 5 pass through the projections or flanges 7. Thus, provision is made for the utilization of bolts 8 cooperating with nuts 9 for holding adjacent sections positively in permanent engagement and in proper alignment. A gasket or sealing member 10 is interposed between adjacent sections, and when the nuts and bolts are inserted and tightened the gasket is compressed, thereby tightly sealing the joint. The gasket may be of rubber, asbestos, fibre or any other suitable material.

A novel method of forming a conduit section is provided. It is customary to form conduit of this general type of ceramic material, such material being extruded to form the sections. Inherently a section formed by the extrusion process is of constant cross-section.

My novel method contemplates the extrusion of a member of substantially constant cross-section and the removal of at least a portion of the member to provide for connecting it to an adjacent section. The portions removed are at the recesses 6, and they may be removed in any suitable manner, as, for example, by cutting them out immediately after extrusion of the section and before the ceramic material has been baked. They may also be removed after the section has undergone the baking operation. The portions removed intersect the corner holes 5 and the recesses are sufficiently deep that an entire bolt and nut may be contained within the periphery of the body of the section. This makes a more compact construction and eliminates rough and pointed projecting parts. This provision is of particular advantage when a number of conduits are laid in contact with one another, inasmuch as each presents a smooth exterior.

A greater insulating effect is produced in conduit according to the present invention than in a simple flanged member of the same size, inasmuch as the body of my conduit section extends outwardly to the same extent as do the end flanges. When a number of conduits are laid side by side in contact with one another, it is preferable to stagger the joints so that the recesses 6 in one conduit will coincide with the central body portion of an adjacent conduit. In this way a very substantial insulating effect is at all times maintained for each cable or wire.

Instead of forming the section with separate recesses 6 adjacent its respective ends, it may be formed with one recess extending the entire length of the section between the end flanges 7. This provides somewhat more access to the bolts but reduces the insulating effect.

In Figure 4 is shown a 6-duct conduit provided with corners of modified shape. Otherwise the construction of the section is identical with that shown in the other figures. The portions 11 of the conduit of Figure 4 are rounded throughout substantially 180° and terminate in curves merging into the wall of the section. This effects a saving of material and also makes the sections easier to handle by reason of the irregular contour of their corners. This feature is of particular advantage in the larger sizes.

While I have shown and described a present preferred embodiment of the invention, it is to be understood that the same is not limited thereto but may be otherwise embodied and practiced within the scope of the following claims.

I claim:

1. A ceramic conduit section for electric installations comprising a unitary homogeneously formed body portion and end flanges integral with the body portion and provided with means for connecting the section to adjacent sections.

2. A ceramic conduit section for electric installations comprising a unitary extruded member having end flanges for connecting the section to adjacent sections.

3. A ceramic conduit section for electric installations having a generally uniform cross-section but having portions removed to provide end flanges for connecting the section to adjacent sections.

4. A ceramic conduit section for electric installations comprising a unitary extruded member having end flanges for connecting the section to adjacent sections, the flanges being provided with holes for receiving connecting means.

5. A ceramic conduit section for electric installations comprising a unitary member having wire receiving means and connecting means receiving holes formed therein throughout its length and having transverse portions removed to permit of insertion of connecting means into the holes.

6. A ceramic conduit section for electric installations comprising a unitary member a portion of the outer surface of which is straight from end to end, another portion being transversely hollowed at a point spaced from the end of the section to provide means for connecting the section to an adjacent section.

7. A ceramic conduit section for electric installations portions of the outer surface of which are straight from end to end, other portions having material removed therefrom at a point spaced from the end of the section to provide means for connecting the section to an adjacent section.

8. A ceramic conduit section for electric installations comprising a unitary extruded member having connecting means receiving holes extruded therein throughout its length, portions of the section intersecting the holes being removed to permit of insertion of connecting means into the holes.

9. A ceramic conduit section for electric installations comprising an integral extruded member having portions near its ends of less cross-section than portions at its ends, whereby to provide flanges for connecting the section to adjacent sections.

10. A ceramic conduit section for electric installations comprising a unitary extruded member having at least one wire receiving opening therethrough and having other holes therethrough from end to end, the section having portions removed intersecting at least some of such other holes whereby to provide for insertion of connecting means thereinto.

11. A ceramic conduit section for electric installations comprising a generally rectangular member portions of the corners of which are removed at points spaced from the end of the section to provide means for connecting the section to an adjacent section.

12. A ceramic conduit section for electric installations which is formed substantially with corners, at least some of such corners having holes therethrough in the direction of the length of the section, portions of the corners being removed to provide for connecting the section to an adjacent section.

13. A conduit for current carrying conductors made up of integral homogeneously formed sections of ceramic material provided with flanges having holes therethrough, the sections being connected by members passing through the holes.

14. A conduit for current carrying conductors made up of sections of ceramic material having a plurality of lateral projections at each end, the sections being connected by members cooperating with the projections.

15. A conduit for current carrying conductors made up of sections of ceramic material bolted together, the bolts lying within the periphery of the body of the conduit.

In testimony whereof I have hereunto set my hand.

LLEWELLYN M. CHRISTIE.